(12) United States Patent
Watanabe (10) Patent No.: US 12,097,613 B2
(45) Date of Patent: Sep. 24, 2024

(54) ROBOT

(71) Applicant: FANUC CORPORATION, Yamanashi (JP)

(72) Inventor: Kei Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/253,823

(22) PCT Filed: Feb. 1, 2022

(86) PCT No.: PCT/JP2022/003741
§ 371 (c)(1),
(2) Date: May 22, 2023

(87) PCT Pub. No.: WO2022/168818
PCT Pub. Date: Aug. 11, 2022

(65) Prior Publication Data
US 2024/0001532 A1    Jan. 4, 2024

(30) Foreign Application Priority Data

Feb. 3, 2021   (JP) ................. 2021-015606

(51) Int. Cl.
*B25J 9/00*    (2006.01)
(52) U.S. Cl.
CPC .................. *B25J 9/0009* (2013.01)
(58) Field of Classification Search
CPC . B25J 9/042; B25J 9/043; B25J 9/0012; B25J 9/0009
USPC .................................................. 74/490.05
See application file for complete search history.

(56) References Cited

U.S. PATENT DOCUMENTS 8,196,492 B1 *   6/2012   Denu ................. B25J 9/042
                                              414/744.5
2017/0334064 A1 * 11/2017  Hashimoto ........... B25J 9/08

FOREIGN PATENT DOCUMENTS

| DE | 4003624 A1 | * | 2/1990 | |
|---|---|---|---|---|
| JP | H06262555 A | | 9/1994 | |
| JP | 2003275977 A | | 9/2003 | |
| JP | 2005193347 A | | 7/2005 | |
| JP | 2007229906 A | | 9/2007 | |
| JP | 2010179386 A | * | 8/2010 | |
| JP | 2013006239 A | | 1/2013 | |
| JP | 2017007011 A | | 1/2017 | |
| KR | 1020100123175 A | * | 11/2010 | |
| WO | WO-9745233 A1 | * | 12/1997 | ............. B25J 21/00 |

* cited by examiner

*Primary Examiner* — T. Scott Fix
(74) *Attorney, Agent, or Firm* — Maier & Maier, PLLC (57) ABSTRACT

A robot includes a first arm, a second arm, and a connector that connects the first arm and the second arm to each other in such a manner as to be rotatable around a vertical axis. The connector includes a columnar-shaped columnar section extending along the vertical axis and a first cover section extending from an outer peripheral surface of the columnar section in a direction intersecting the vertical axis. The second arm includes a main body section connected to the columnar section and a second cover section attached to the first cover section to surround a space in an enclosed state. The space is faced by at least a portion of the outer peripheral surface and a surface of the main body section located toward the first arm.

4 Claims, 8 Drawing Sheets

ROBOT

TECHNICAL FIELD

The present disclosure relates to robots.

BACKGROUND

A known ceiling-mounted SCARA robot includes a first arm and a second arm that are horizontally rotatable (e.g., see Japanese Unexamined Patent Application, Publication No. 2017-7011). This SCARA robot includes a head cover that covers an operation shaft and a driver from above. The operation shaft is supported by the distal end of the second arm. The driver drives the operation shaft.

SUMMARY

An aspect of the present disclosure provides a robot including a first arm, a second arm, and a connector that connects the first arm and the second arm to each other in such a manner as to be rotatable around a vertical axis. The connector includes a columnar-shaped columnar section extending along the vertical axis and a first cover section extending from an outer peripheral surface of the columnar section in a direction intersecting the vertical axis. The second arm includes a main body section connected to the columnar section and a second cover section attached to the first cover section to surround a space in an enclosed state. The space is faced by at least a portion of the outer peripheral surface and a surface of the main body section located toward the first arm.

DETAILED DESCRIPTION OF EMBODIMENTS

A robot 1 according to an embodiment of the present disclosure will be described below with reference to the drawings.

Figure 1:
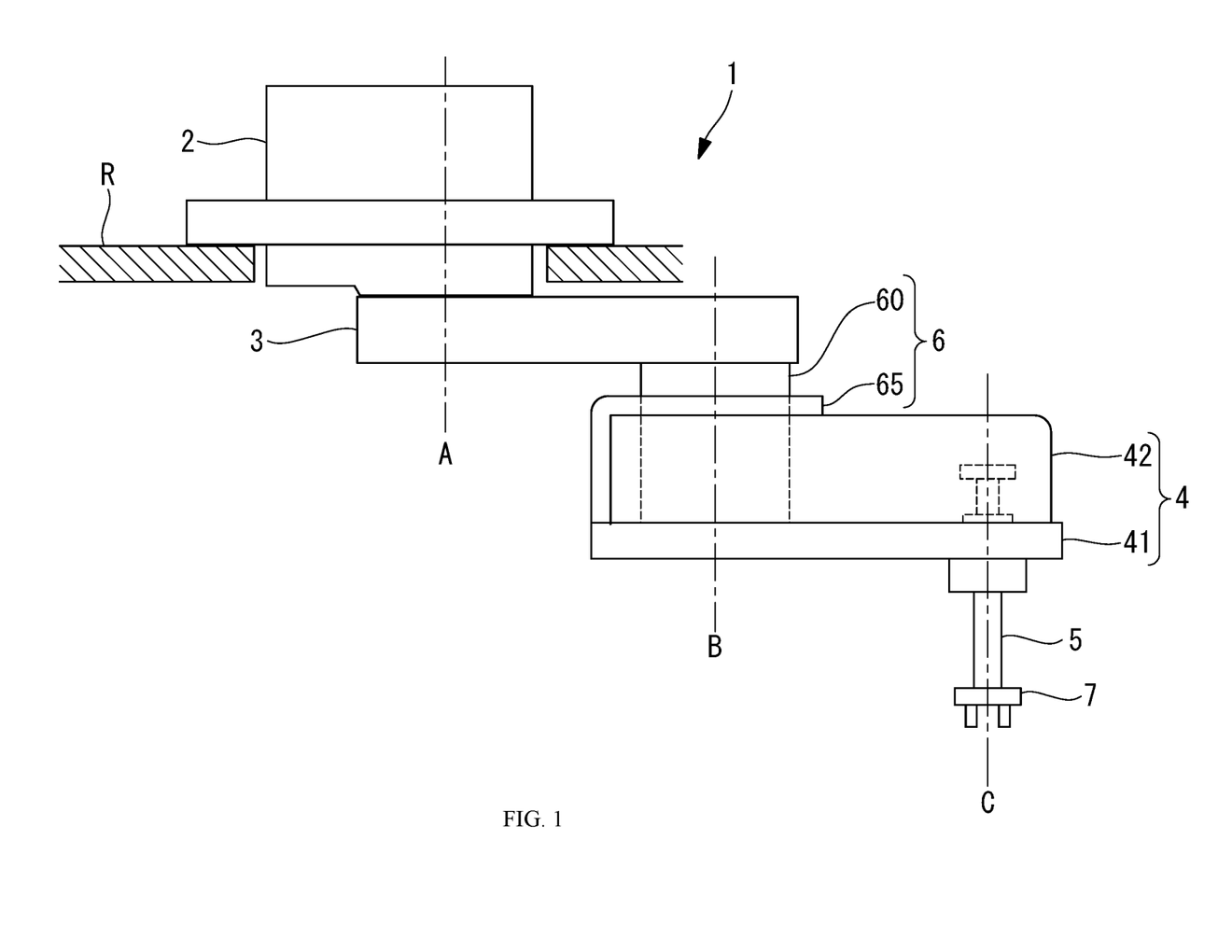
FIG. 1 is a side view illustrating the overall configuration of a robot according to an embodiment of the present disclosure.

For example, as shown in FIG. 1, the robot 1 according to this embodiment is a ceiling-mounted horizontal articulated robot.

The robot 1 includes a base 2 installed on, for example, a ceiling R and a first arm 3 supported by the base 2 in such a manner as to be rotatable around a first axis A extending in the vertical direction. The robot 1 also includes a second arm 4 disposed below the first arm 3 with a distance therebetween and a connector 6 that connects the second arm 4 to the first arm 3 in such a manner as to be rotatable around a second axis (vertical axis) B extending parallel to the first axis A.

Figure 2:
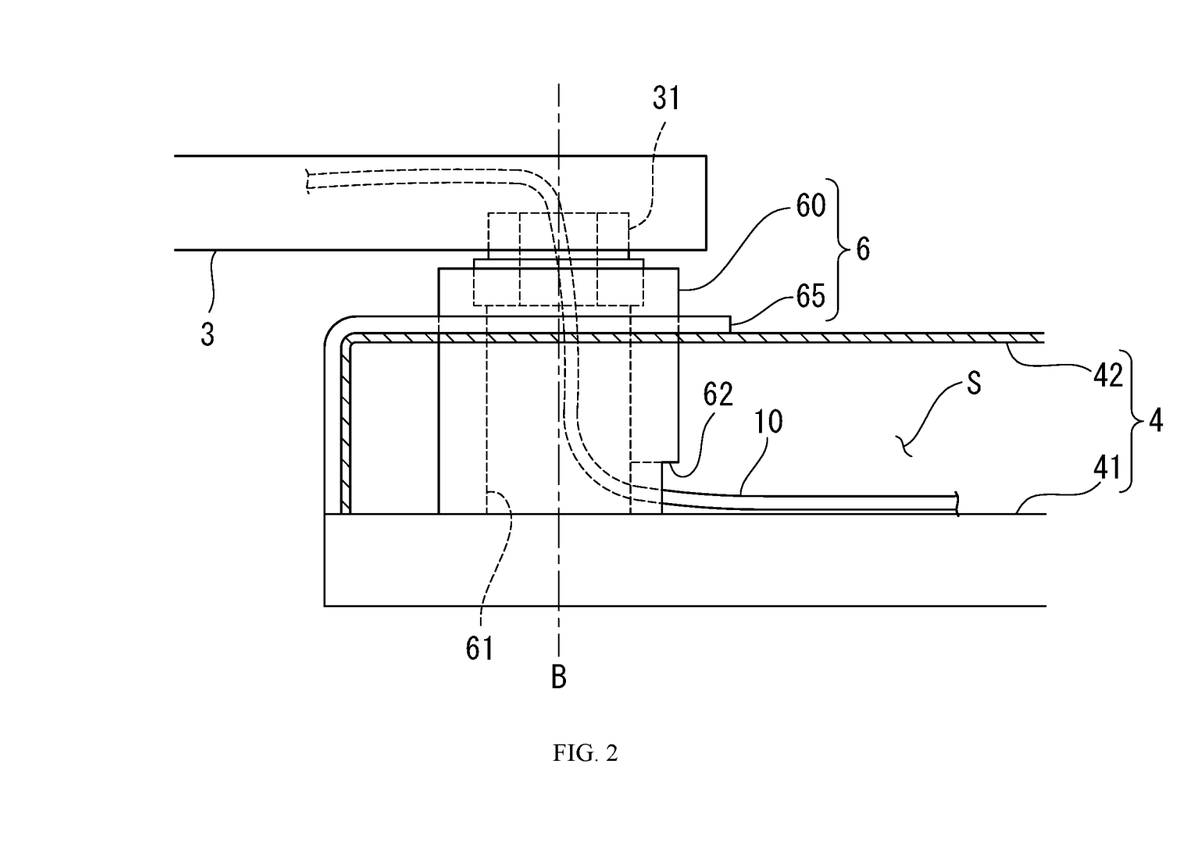
FIG. 2 is a partial vertical sectional view illustrating a connector and a part of the second arm of the robot in FIG. 1.
Figure 4:
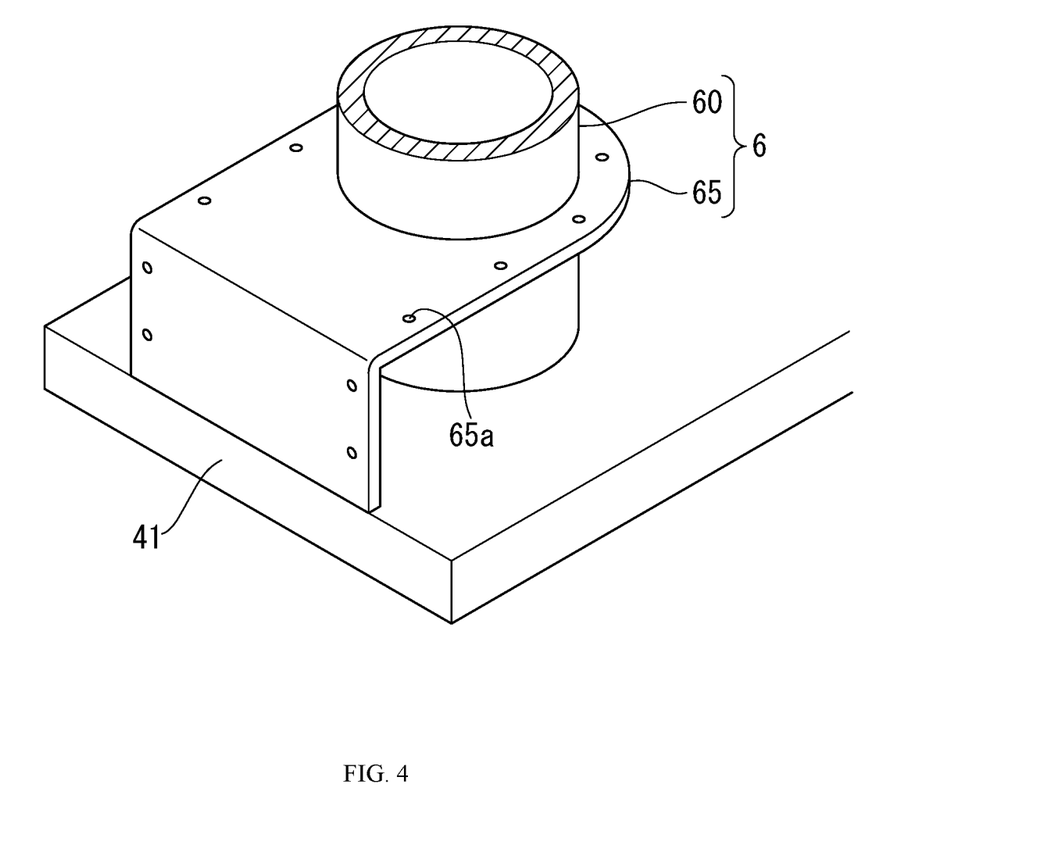
FIG. 4 is a perspective view illustrating the connector and a part of a main body section of the robot in FIG. 1.

As shown in FIG. 2 and FIG. 4, the connector 6 includes a columnar section 60 extending along the second axis B below the first arm 3 and a first cover section 65 protruding radially outward in a flanged-like fashion around the entire circumference of the columnar section 60 from an intermediate position thereof in the direction of the second axis B.

The columnar section 60 has a cylindrical shape centered on the second axis B. A reducer 31 that reduces the speed of rotation of a servo motor (not shown) and outputs the rotation is attached between the upper end of the columnar section 60 and the first arm 3. In this embodiment, the columnar section 60 and the reducer 31 have a through-hole 61 extending along the second axis B. A passage 62 is provided in the vicinity of the lower end of the columnar section 60 and extends therethrough in the radial direction from the outside to the through-hole 61.

As shown in FIG. 1 and FIG. 2, the second arm 4 includes a main body section 41 fixed to the lower end of the columnar section 60 and extending in the horizontal direction, and also includes a second cover section 42 attached to a position where it covers the upper surface of the main body section 41. The distal end of the second arm 4 is provided with a shaft 5 that extends through the main body section 41 in the vertical direction and whose upper end is disposed within a space S surrounded by the second cover section 42. The shaft 5 is supported in such a manner as to be ascendable and descendible along a third axis C extending parallel to the first axis A. For example, a tool 7, such as a hand, is attached to the lower end of the shaft 5.

The first arm 3, the columnar section 60 and the first cover section 65 of the connector 6, and the main body section 41 of the second arm 4 are each composed of, for example, metal, such as an aluminum alloy. The second cover section 42 is composed of resin.

The first cover section 65 has a section that extends from the center of the columnar section 60 toward the rear end of the second arm 4 and that has a fixed width larger than the diameter of the columnar section 60, is L-shaped by being bent downward by 90° at the rear end, and has its lower end fixed to the upper surface of the main body section 41. The gap between the columnar section 60 and the first cover section 65 is sealed around the entire circumference. As shown in FIG. 4, the outer peripheral edge of the first cover section 65 is provided with a plurality of through-holes 65a extending therethrough in the thickness direction and spaced apart from each other along the outer peripheral edge.

Figure 5:
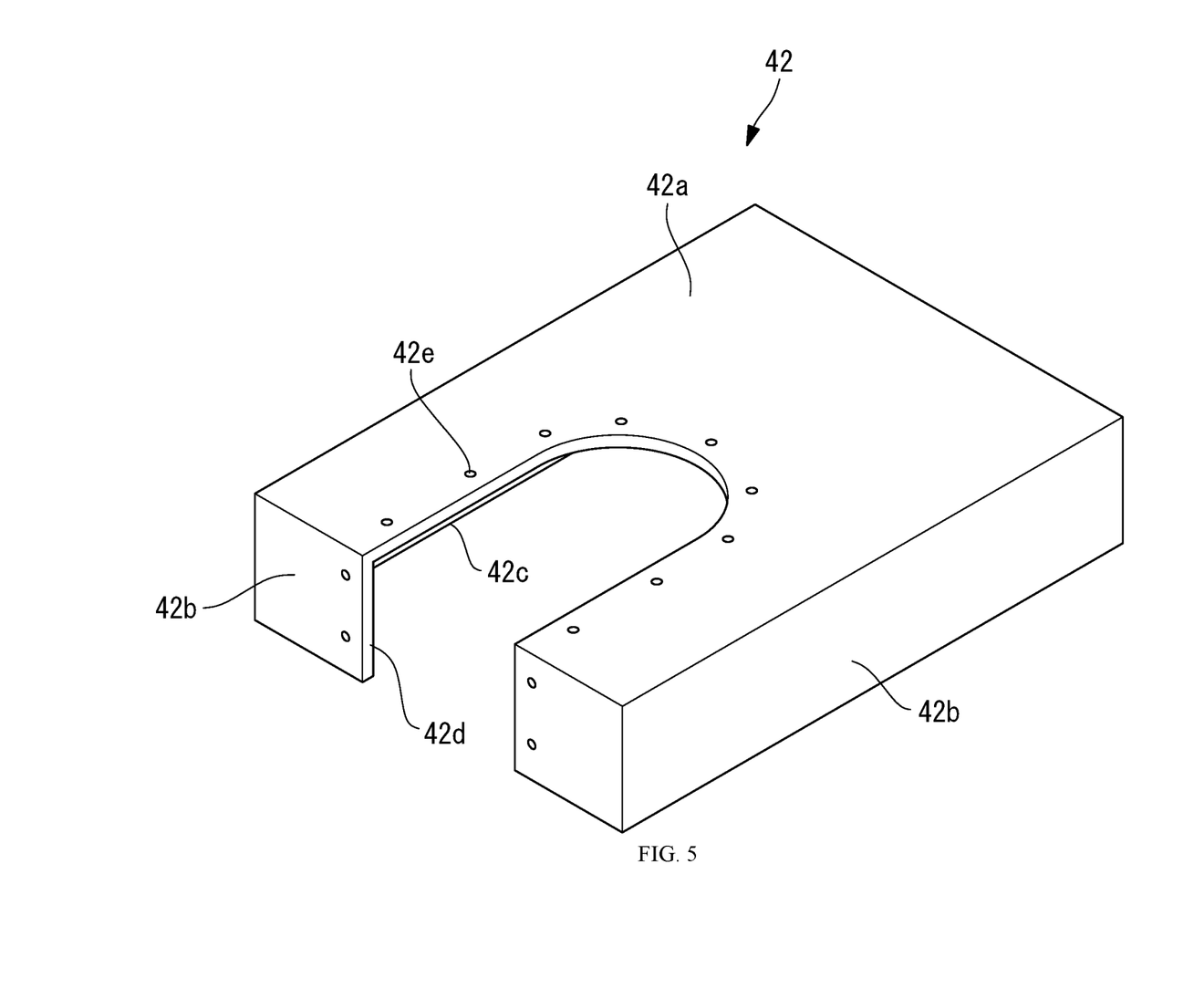
FIG. 5 is a perspective view illustrating a second cover section of the robot in FIG. 1.

As shown in FIG. 5, the second cover section 42 includes a top plate 42a and four continuous sidewalls 42b around the top plate 42a, and is box-shaped with a lower opening 42c. The second cover section 42 is provided with a cutout 42d extending from the top plate 42a to one of the sidewalls 42b. The cutout 42d has a width larger than the diameter of the columnar section 60 of the connector 6 and smaller than the width of the first cover section 65, and extends from a rear area of the top plate 42a to the opening 42c at the maximum height of the rear sidewall 42b.

The peripheral edge of the cutout 42d is provided with a plurality of screw holes 42e at positions to be aligned with the plurality of through-holes 65a in the first cover section 65 when the second cover section 42 and the first cover section 65 are combined with each other. Furthermore, the peripheral edge of the opening 42c is provided with a plurality of through-holes (not shown) used for attaching the second cover section 42 to the upper surface of the main body section 41.

Figure 3:
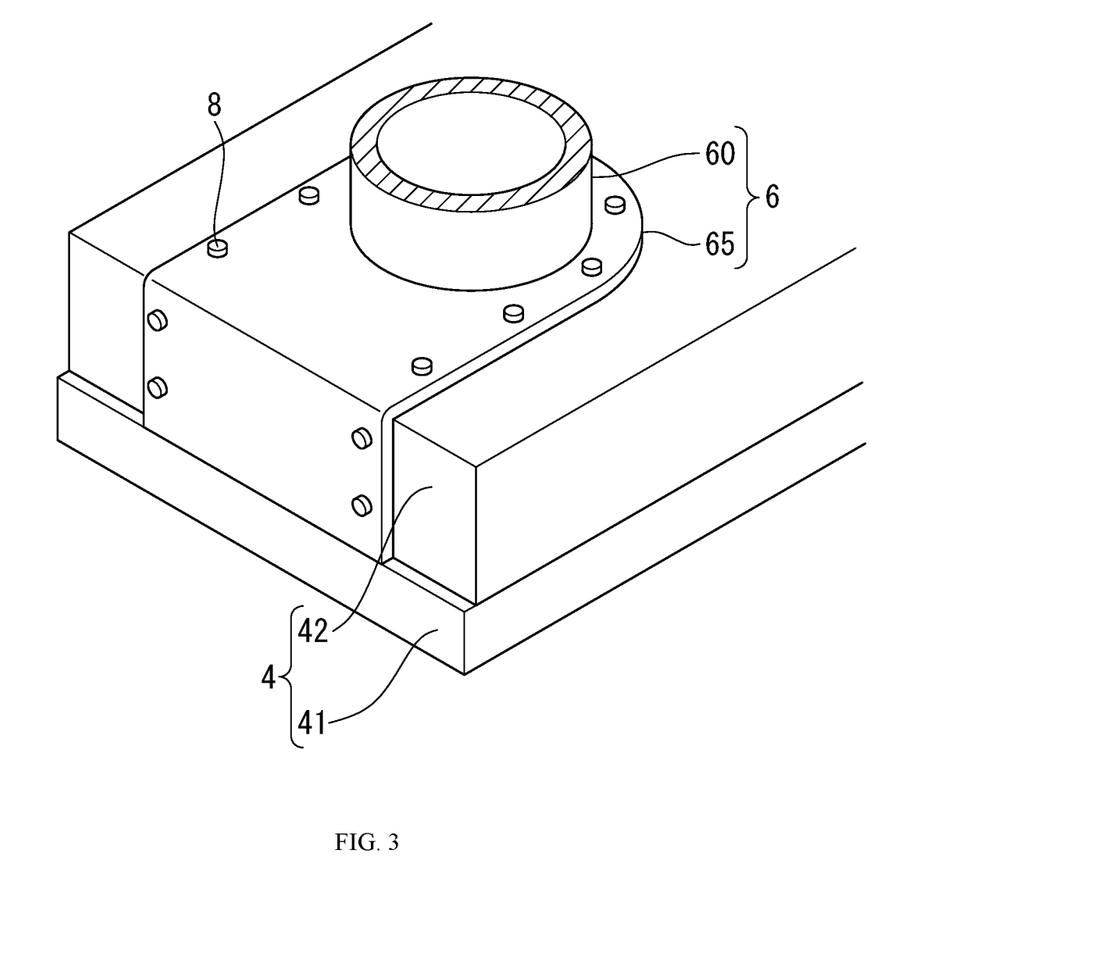
FIG. 3 is a perspective view illustrating the connector and a part of the second arm of the robot in FIG. 1.

As shown in FIG. 3, the second cover section 42 is set on the upper surface of the main body section 41 and is fixed to the first cover section 65 by fastening bolts 8 extending through the through-holes 65a to the screw holes 42e in a state where the columnar section 60 is fitted in the cutout 42d. Moreover, the second cover section 42 is fixed to the main body section 41 by fastening bolts (not shown) extending through the through-holes provided along the peripheral edge of the opening 42c to screw holes (not shown) provided in the main body section 41.

Accordingly, as shown in FIG. 2, the space S faced by the upper surface of the main body section 41 of the second arm 4 and an area, located below the first cover section 65, of the outer peripheral surface of the columnar section 60 of the connector 6 is surrounded by the first cover section 65 and the second cover section 42.

A driver (not shown) for driving the shaft 5 is disposed in the space S surrounded by the second cover section 42 and located above the main body section 41. The driver is connected to a cable 10 that transmits electric power and signals supplied from a controller (not shown).

As shown in FIG. 2, the cable 10 extends through the interior of the first arm 3 and through the through-hole 61 in the columnar section 60 from the controller and is routed to the space S via the passage 62 extending through the columnar section 60 in the radial direction.

The operation of the robot 1 according to this embodiment having the above-described configuration will now be described.

In the robot 1 according to this embodiment, the resinous second cover section 42 is combined with and fastened to the metallic first cover section 65 and the metallic main body section 41, so that the space S above the main body section 41 can be enclosed in a sealed state.

Specifically, the resinous second cover section 42 is elastically deformable and is not stable in shape. Therefore, if the first cover section 65 to be combined therewith is also composed of resin, it is difficult to seal the mating surfaces of the two. Since the first cover section 65 and the main body section 41 to be combined with the resinous second cover section 42 are composed of metal, the mating surfaces therewith can be readily sealed. Moreover, the first cover section 65 and the columnar section 60 do not move relatively to each other, so that, for example, the two can be hermetically sealed by any method, such as welding or bonding.

Accordingly, the second cover section 42 can be reduced in weight by being composed of resin, and the space S above the main body section 41 can be hermetically sealed. This is advantageous in terms of preventing, for example, intrusion of water droplets from the outside and protecting, for example, the cable 10 exposed inside the space S.

Furthermore, the space S faced by the outer peripheral surface provided with the passage 62 of the columnar section 60 is surrounded by the first cover section 65 and the second cover section 42, so that, for example, the cable 10 can be routed to the driver via the passage 62 without being exposed to the outside even if the cable 10 is not routed inside the main body section 41. This is advantageous in that the structure of the second arm 4 does not need to be made complex.

When performing maintenance on the driver disposed on the upper surface of the main body section 41, the second cover section 42 is removed by unfastening the bolts used for fixing the second cover section 42 to the main body section 41 and the first cover section 65. Then, the second cover section 42 is removed from the upper surface of the main body section 41, whereby the driver on the upper surface of the main body section 41 becomes exposed.

Accordingly, the driver becomes accessible from the outside, and a working space is ensured around the driver, so that an operator can readily perform a maintenance process on the driver.

With the second cover section 42 being composed of elastically deformable resin, the second cover section 42 can be elastically deformed when the second cover section 42 is attached to or detached from the main body section 41. Accordingly, interference with components disposed in the space S surrounded by the second cover section 42 can be readily avoided. This is advantageous in that the attachment-detachment process can be performed more smoothly.

As an alternative to this embodiment in which the first cover section 65 is composed of a metallic flat plate, the first cover section 65 may be composed of any other material with higher rigidity than the second cover section 42.

Furthermore, as an alternative to this embodiment in which the main body section 41, the columnar section 60, and the first cover section 65 are independent components, for example, the three may be fabricated integrally as a single component by aluminum die casting.

Accordingly, the number of components can be reduced, and the process for attaching and detaching the main body section 41 and the columnar section 60 to and from each other and the process for attaching and detaching the first cover section 65 to and from the main body section 41 and the columnar section can be omitted. This enables enhanced working efficiency during, for example, the manufacturing process and the maintenance process of the robot 1 according to this embodiment. With the first cover section 65 and the columnar section 60 being integrated with each other, the two can be sealed more simply and more reliably.

As an alternative to this embodiment in which the first arm 3 and the columnar section 60 are independent components, the first arm 3 and the columnar section 60 may be fabricated integrally as a single component.

Figure 6:
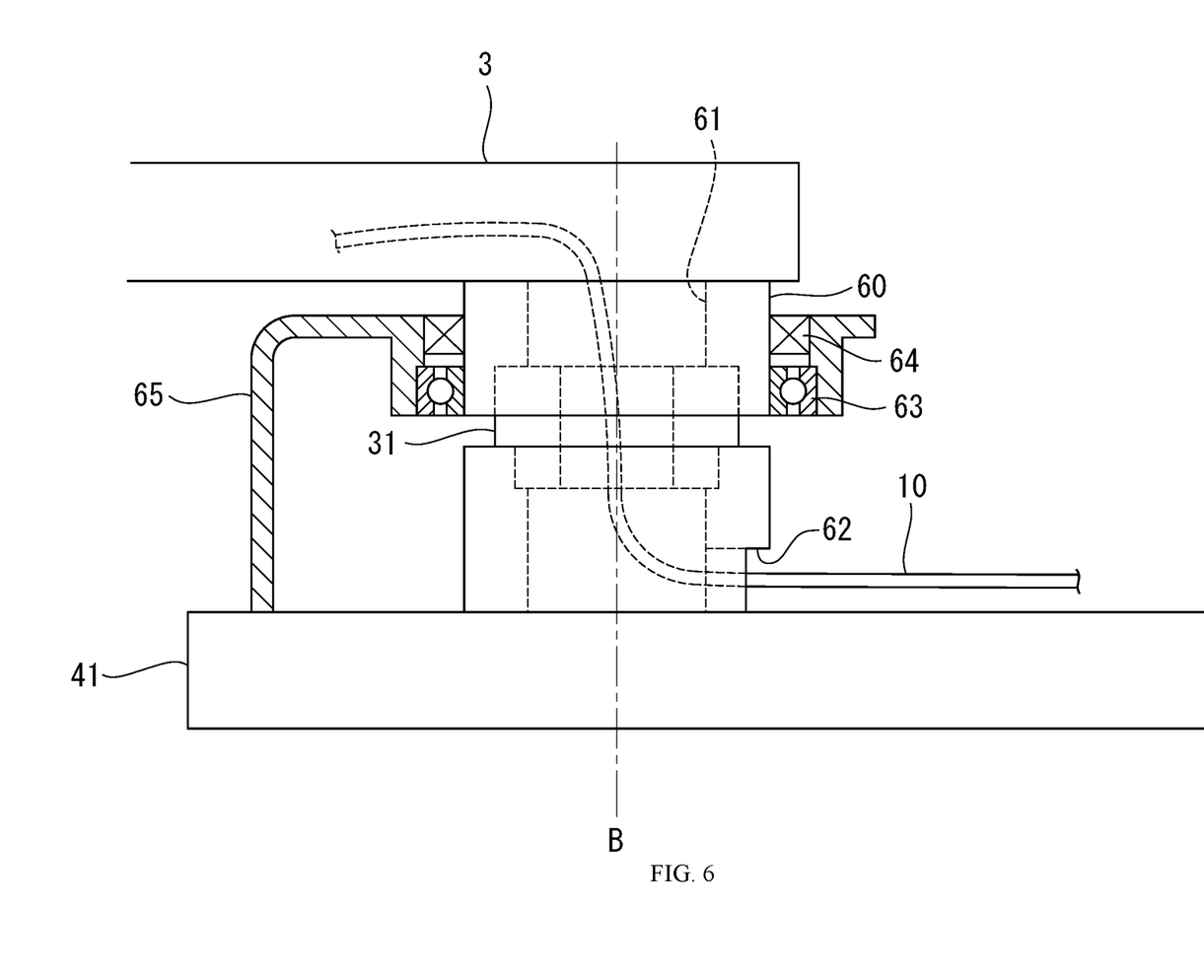
FIG. 6 is a partial vertical sectional view illustrating the connector and a part of the second arm according to a first modification of the robot in FIG. 1.

In detail, for example, as shown in FIG. 6, a bearing 63 that supports the columnar section 60 and the first cover section 65 in a rotatable manner and a rotational seal member 64, such as an oil seal, may be provided between the first cover section 65 and an area where the outer peripheral surface of the columnar section 60 is fixed to the first arm 3.

As an alternative to this embodiment in which the first cover section 65 seals the outer peripheral surface of the columnar section 60 around the entire circumference thereof, the first cover section 65 may seal only a portion of the outer peripheral surface of the columnar section 60 in the circumferential direction.

Figure 7:
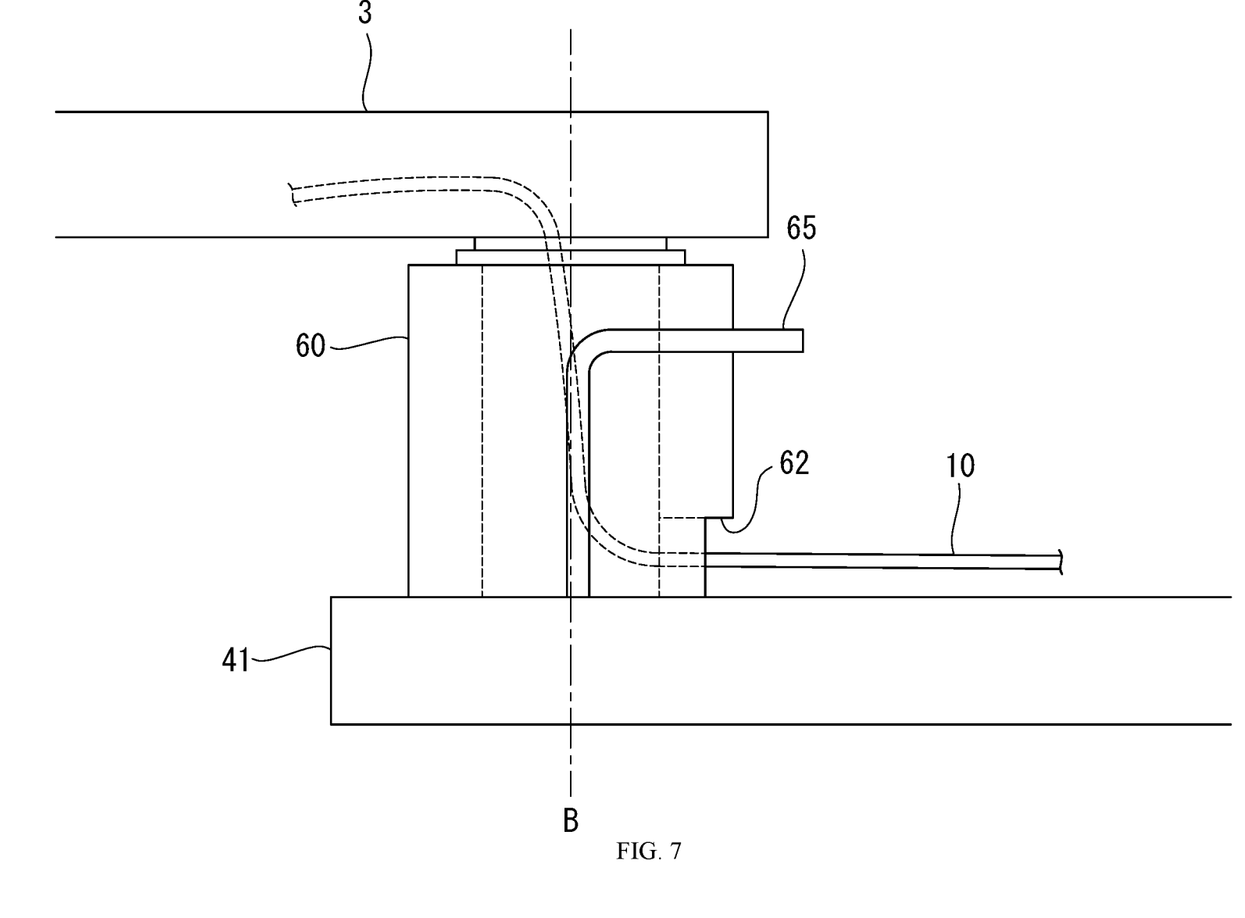
FIG. 7 is a side view illustrating the connector according to a second modification of the robot in FIG. 1.
Figure 8:
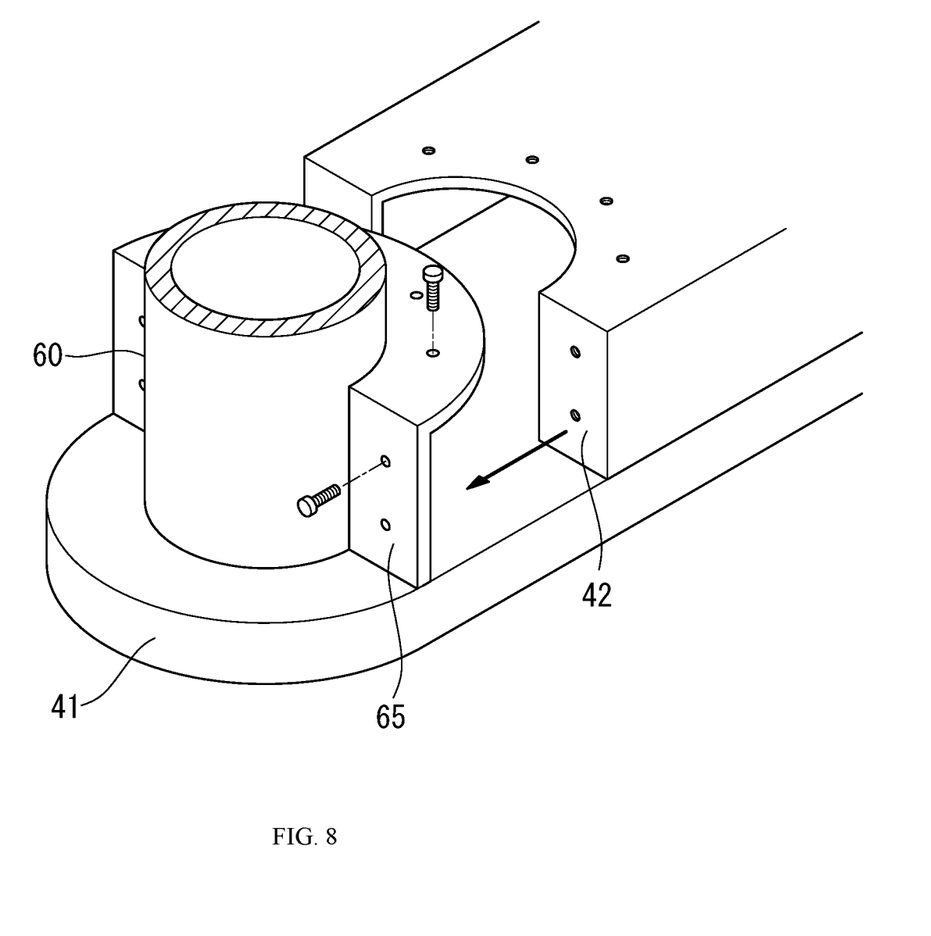
FIG. 8 is a perspective view illustrating a method of how a first cover section and the second cover section of the robot in FIG. 7 are combined with each other.

For example, as shown in FIG. 7 and FIG. 8, only an area where the passage 62 is provided in the outer peripheral surface of the columnar section 60 may be surrounded by the first cover section 65 and the second cover section 42, whereby advantages similar to those described above can be achieved.

Although the columnar section 60 is cylindrical in this embodiment, the shape is not limited to this. The columnar section 60 may have any shape so long as the shape allows the first arm 3 and the second arm 4 to be connected to each other.

Although the robot 1 is described as being a ceiling-mounted horizontal articulated robot in this embodiment, the robot 1 is not limited thereto and may be a horizontal articulated robot installed on a horizontal floor.

The invention claimed is:

1. A robot comprising:
   a first arm;
   a second arm that includes a main body section; and
   a connector that is provided between the first arm and the second arm and includes a columnar-shaped columnar section, the columnar section extending along a vertical axis and connecting the first arm and the main body to each other in such a manner as to be rotatable around the vertical axis,
   wherein the connector further includes first cover section extending in a direction intersecting the vertical axis from an outer peripheral surface of the columnar section at an intermediate position of the columnar section in a direction of the vertical axis, and
   wherein the second arm further includes a box-shaped second cover section configured to be set on surface of the main body section located toward the first arm and to surround the outer peripheral surface, and
   wherein the first cover section and the second cover section are fastened to each other so that a space faced by at least a portion of the outer peripheral surface and the surface of the main body section located toward the first arm is sealed.

2. The robot according to claim 1, wherein the second cover section includes a cutout, the outer peripheral surface is surrounded by the cutout, and the first cover section has a shape capable of blocking the cutout.

3. The robot according to claim 1, wherein the second cover section is composed of an elastically deformable material, and the first cover section is composed of a material more rigid than the second cover section.

4. The robot according to claim 1, wherein the main body section and the connector are integrated with each other.

* * * * *